(12) United States Patent
Huang et al.

(10) Patent No.: US 7,377,158 B2
(45) Date of Patent: May 27, 2008

(54) TIRE PRESSURE SENSOR SYSTEM WITH IMPROVED POWER SAVING

(75) Inventors: Su Shiong Huang, Belleville, WA (US); Shengbo Zhu, San Jose, CA (US)

(73) Assignee: Silicon Valley Micro C Corp., San Jose, CA (US)

( * ) Notice: Subject to any disclaimer, the term of this patent is extended or adjusted under 35 U.S.C. 154(b) by 0 days.

(21) Appl. No.: 11/725,005

(22) Filed: Mar. 16, 2007

(65) Prior Publication Data

US 2007/0180900 A1    Aug. 9, 2007

Related U.S. Application Data

(62) Division of application No. 11/267,775, filed on Nov. 4, 2005, now Pat. No. 7,222,523.

(51) Int. Cl.
*G01M 17/02* (2006.01)

(52) U.S. Cl. ...................................... 73/146.5; 340/442

(58) Field of Classification Search ............... 73/146.5; 340/442
See application file for complete search history.

(56) References Cited

U.S. PATENT DOCUMENTS

| 3,697,944 | A | * | 10/1972 | Murano ...................... 340/447 |
| 5,838,229 | A | * | 11/1998 | Robinson, III .............. 340/442 |
| 6,111,520 | A | * | 8/2000 | Allen et al. ............ 340/870.16 |
| 7,000,462 | B2 | * | 2/2006 | Hillenmayer et al. ...... 73/146.5 |

* cited by examiner

*Primary Examiner*—Andre J. Allen

(57) ABSTRACT

A battery powered vehicle tire pressure sensor system has a power saving unit which controls the application of electrical power to the system as a function of tire speed to prolong battery life. The power saving unit has a power control switch which is responsive to tire angular speed. Each sensor assembly of the system is mounted on or in the side wall of a pneumatic tire to generate signals representative of tire pressure whenever power is applied. A processor periodically samples the signals. When the processor determines that the tire pressure is outside a safe range, an r.f. generator is activated by the processor to generate an unsafe tire pressure signal. This signal is converted by a receiver to a warning for the driver.

20 Claims, 14 Drawing Sheets

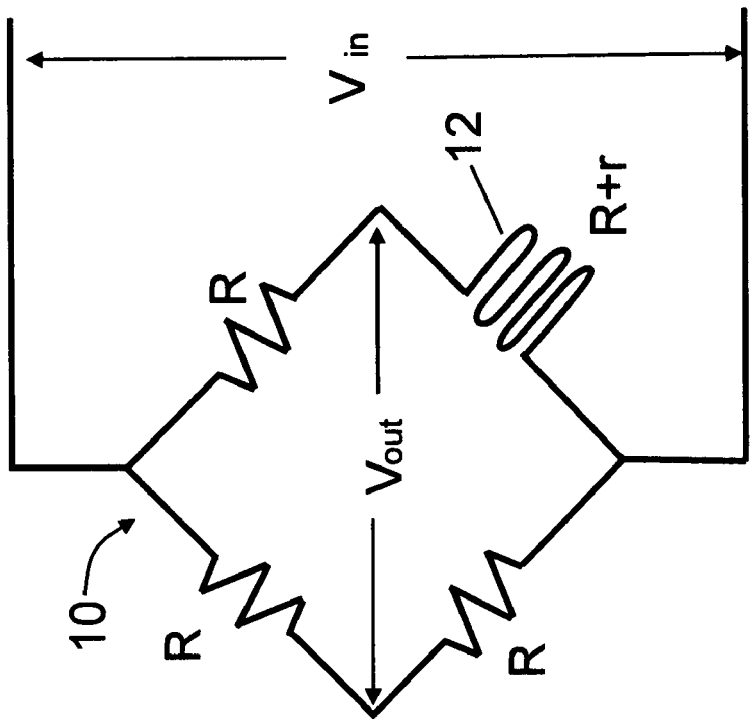
Prior Art
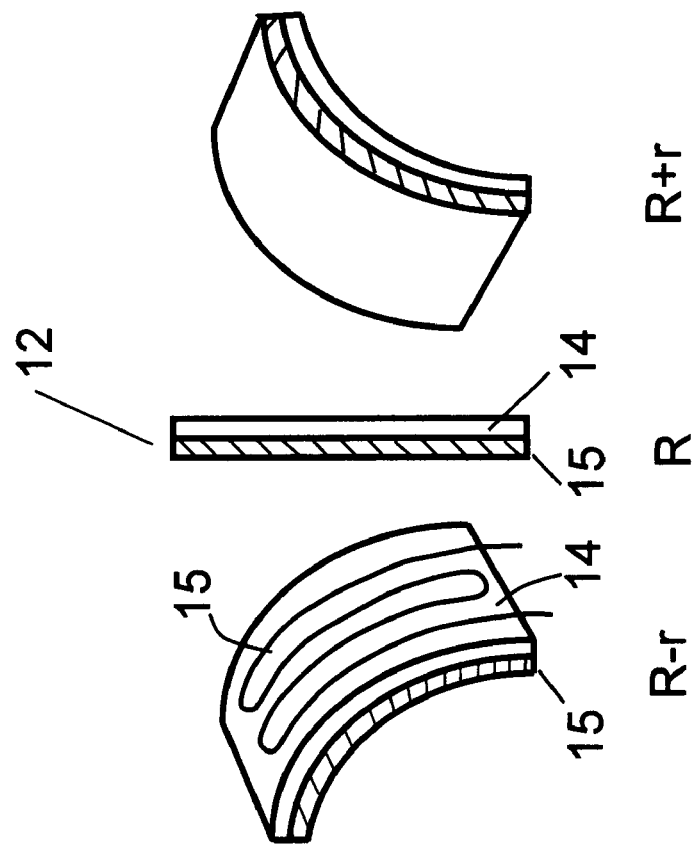
FIG.1

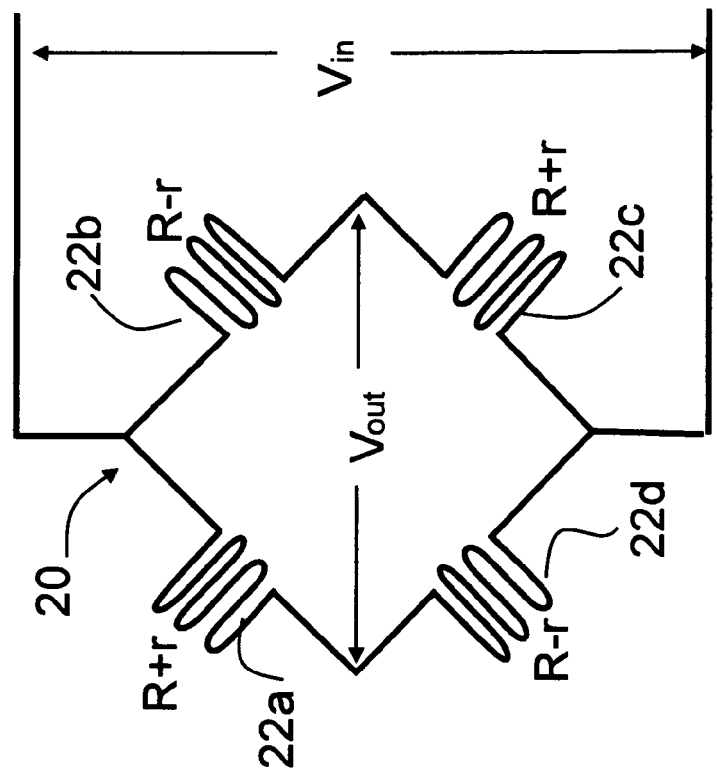
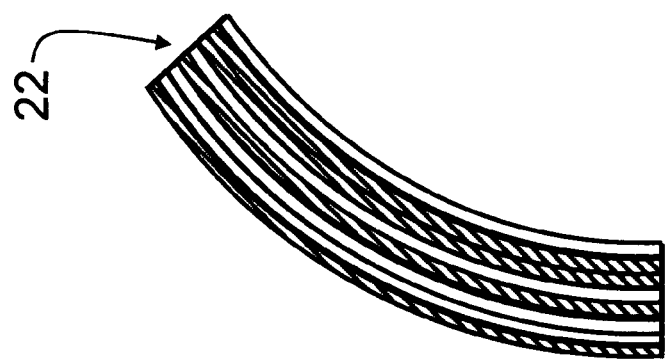
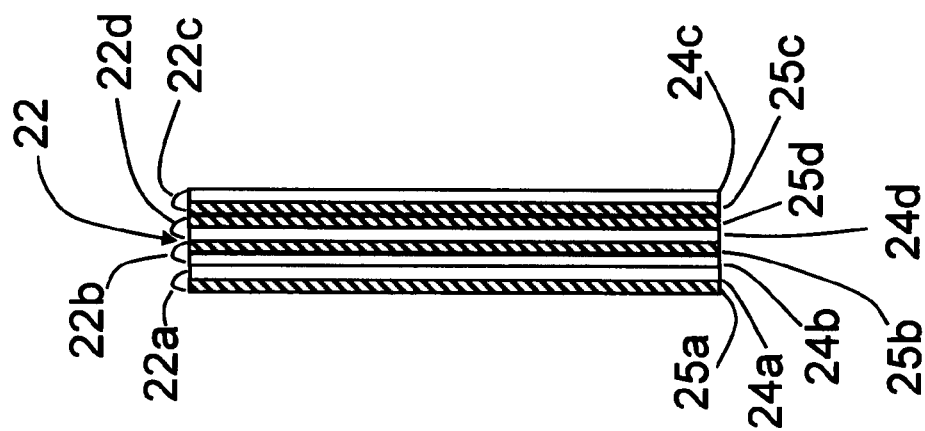
FIG.2

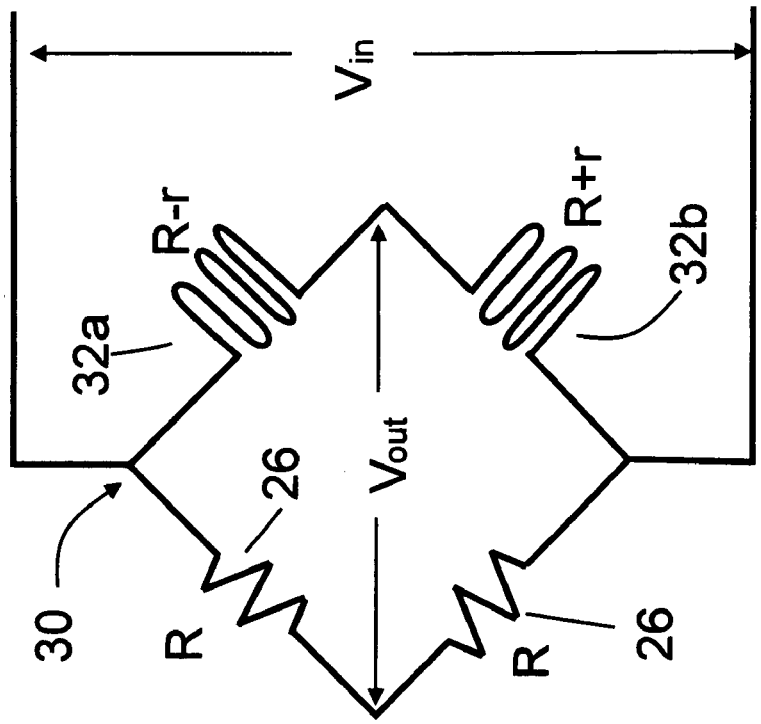
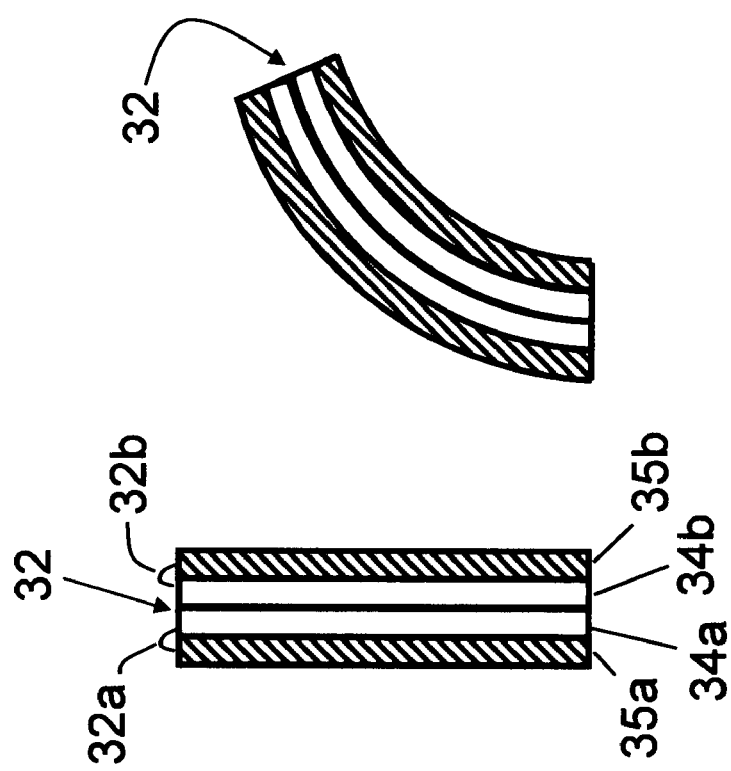
FIG.3

For Single sensor $$V_{out} = V_{in}\left[\frac{R+r}{R+(R+r)} - \frac{1}{2}\right]$$

$$= V_{in}\frac{r}{2(2R+r)}$$

$$\approx \boxed{\frac{r}{4R}V_{in}}$$

For Two sensors $$V_{out} = V_{in}\left[\frac{R+r}{(R+r)+(R-r)} - \frac{1}{2}\right]$$

$$= \boxed{\frac{r}{2R}V_{in}}$$

For Four sensors $$V_{out} = V_{in}\left[\frac{R+r}{(R+r)+(R-r)} - \frac{R-r}{(R+r)+(R-r)}\right]$$

$$= \boxed{\frac{r}{R}V_{in}}$$

FIG.4

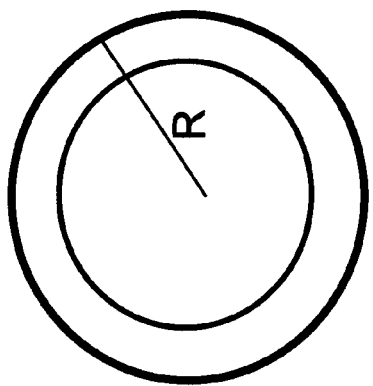
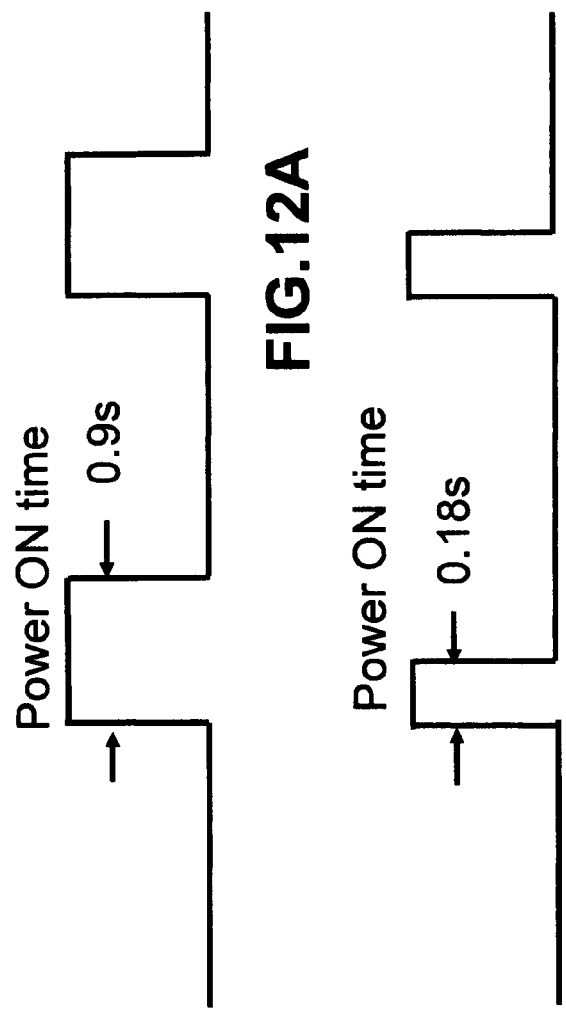
FIG.12A
FIG.12B

TIRE PRESSURE SENSOR SYSTEM WITH IMPROVED POWER SAVING

CROSS-REFERENCE TO RELATED APPLICATION

This application is a divisional application of U.S. patent application Ser. No. 11/267,775 filed Nov. 4, 2005 now U.S. Pat. No. 7,222,523 for "Tire Pressure Sensor System With Improved Sensitivity And Power Saving".

BACKGROUND OF THE INVENTION

This invention relates to automotive tire pressure sensors. More particularly, this invention relates to a battery powered method and system for monitoring internal tire pressure of vehicle tires using a sensor system with improved sensitivity and a power saving device.

Tire pressure sensor systems are known and are commonly used to monitor the internal air pressure in individual pneumatic tires of a vehicle and to provide a warning signal to the driver whenever the internal air pressure in one or more of the vehicle tires is dangerously low or high. The warning signal is typically generated by an r.f. signal generator controlled by a microprocessor connected to the tire pressure sensor, the warning signal being generated whenever the internal tire pressure measured by the sensor lies outside a predetermined normal operating range, signifying either a high or a low pressure condition. This r.f. signal is transmitted to a vehicle-mounted receiver, which uses the warning signal to alert the driver either visually (by activating a warning lamp or display) or audibly (by activating an audible alarm) or both. Electrical power to the sensor circuitry is provided by a battery, which must be replaced when the available power drops below a useful level.

Known tire pressure systems, such as that disclosed in commonly assigned, co-pending patent application Ser. No. 10/346,490 filed Jan. 21, 2003 for "External Mount Tire Pressure Sensor System", the disclosure of which is hereby incorporated by reference, use a mechanical strain sensor having an essentially linear variable resistance characteristic in one branch of an electrical bridge circuit to measure the internal pressure of a tire to which the sensor is attached. This type of sensor is relatively insensitive to mechanical vibrations, which are regularly encountered in an automotive environment. In addition, the configuration of the electrical circuitry (i.e., the electrical bridge circuit) is relatively simple, has well-known performance characteristics, and has been found to be reasonably reliable in operation.

In spite of the effectiveness of the known sensor circuitry using the strain sensor and bridge circuit, there are inherent limitations which limit the performance of such devices. Firstly, due to the fact that only a single variable resistance element (the strain gauge) is incorporated into one branch of the bridge circuit, the sensitivity of the sensor circuit is limited to the variable resistance range of the single strain gauge used. This limits the potential measurement range of the sensor system. In addition, the known sensor circuitry is susceptible to measurement inaccuracies due to different coefficients of thermal resistivity of the variable resistance strain sensor and the fixed resistances forming the bridge circuit. Secondly, since the sensor circuitry is continuously powered by the essential battery, the useful lifetime of the battery is limited by the battery energy capacity. This drawback is compounded by the need for components having relatively small physical size due to installation constraints. As a consequence, battery replacement is a major constraint to the efficacy of such known sensor systems.

Efforts to provide a simple yet accurate and durable tire pressure monitoring system devoid of the above-noted disadvantages have not been successful to date.

SUMMARY OF THE INVENTION

The invention comprises a method and system for monitoring internal vehicle tire pressure employing a power saving unit providing extended useful battery life.

From an apparatus aspect the invention comprises a power saving unit for use in a tire pressure sensor system having an electrically powered sensor for providing electrical signal values indicative of internal tire pressure when coupled to a pneumatic tire; a processor coupled to the sensor for converting electrical signal values corresponding to inadequate internal tire pressure to r.f. generator activation signals; and an r.f. generator circuit for transmitting an unsafe tire pressure warning signal when activated by the processor. The power saving unit limits the application of electrical power to the sensor in a manner related to tire speed so that power is only applied, and thus drawn from the battery, for a measurement period related to tire speed after the tire speed has reached a threshold speed value. Preferably, this measurement period is related to the time required for a tire of a given size to complete a preselected number of revolutions.

The power saving unit has an input terminal adapted to be coupled to a source of electrical power (the battery in a particular embodiment), an output terminal for supplying electrical power to the sensor, and a vehicle speed sensitive switch for connecting the input terminal to the output terminal when the tire attains a first predetermined speed and for disconnecting the input terminal from the output terminal when the speed of the tire drops below the first predetermined speed. In one embodiment, the switch comprises an electrically conductive contact member, such as a spring, having a first portion connected to the output terminal and a free end, and an electrically conductive pivot member, such as a spring or a pivot arm, having a first portion connected to the input terminal and a mass member mounted on a free end. The mass member is mounted to make physical contact with the free end of the contact member when the tire attains the first predetermined speed, thus enabling the transfer of electrical power from the input terminal to the output terminal. Preferably, the mass member has opposing ends; and the switch is provided with first and second contact members connected to the output terminal, with the first contact member having a free end located in the path of one of the opposing ends of the mass member, and the -second contact member having a free end located in the path of the other one of the opposing ends of the mass member. With this configuration, the positioning of the power saving unit on a vehicle tire is facilitated.

In an alternate embodiment, a magnetically actuatable reed switch is coupled between the input terminal and output terminal, and a magnet is mounted on the free end of the pivot arm to activate the reed switch when the tire attains the first predetermined speed.

In an alternate embodiment, the power saving unit further includes a control signal output terminal coupled to the processor; and the vehicle speed sensitive switch includes control signal means for connecting the power input terminal to the control signal output terminal when the tire attains a second predetermined speed different from (and preferably higher than) the first predetermined speed and for disconnecting the input terminal from the control signal output terminal when the speed of the tire drops below the second predetermined speed. When received, the control signal serves as an indication to the processor that a different smaller measurement period can now be used. This different measurement period is also related to the time required for the tire to complete a preselected number of revolutions.

In this embodiment, the switch configuration is essentially the same as the switch used in the first embodiment. The control signal means comprises a contact member having a first portion connected to the control signal output terminal and a free end, and the mass member in the switch is mounted to make physical contact with the free end of the contact member when the tire attains the second predetermined speed. Similar to the first embodiment, the mass member preferably has opposing ends; and the control signal means includes first and second contact members connected to the control signal output terminal, the first contact member having a free end located in the path of one of the opposing ends of the mass member, and the second contact member having a free end located in the path of the other one of the opposing ends.

From a process aspect, the invention comprises a method of reducing power consumption in an electrically powered tire pressure sensor system having a variable resistance sensor for providing resistance values indicative of internal tire pressure when coupled to a pneumatic tire, a processor coupled to the sensor for converting resistance values corresponding to inadequate tire pressure to r.f. generator activation signals, and an r.f. generator circuit for transmitting an unsafe tire pressure warning signal when activated by the processor, the method comprising the steps of:

(a) providing a source of electrical power; and (b) applying the electrical power to the variable resistance sensor for a tire pressure measurement period whose duration is a related to tire speed. Step (b) of applying preferably includes the steps of (i) preventing the application of electrical power to the variable resistance sensor until the tire speed reaches a first tire speed threshold, (ii) furnishing electrical power to the variable resistance sensor for a measurement period related to the period of time required for a preselected number of tire revolutions at the first tire speed threshold when the tire speed reaches the first tire speed threshold, and (iii) terminating the application of electrical power to the variable resistance sensor when the tire speed falls below the first tire speed threshold.

The method may further provide for a second measurement period by modifying step (b) of applying to further include the step of changing the length of the measurement period to a different value when the tire speed reaches a second tire speed threshold, the different value being related to the period of time required for a preselected number of tire revolutions at the second tire speed threshold.

The invention provides a convenient solution to the problem of monitoring internal tire pressure in vehicles equipped with pneumatic tires. The system can be installed either during manufacture of a new tire, manufacture of a new vehicle or as an aftermarket item. Further, existing vehicles without tire pressure sensor systems can easily be retrofitted with a state-of-the-art system at relatively low cost. This is particularly beneficial in jurisdictions which mandate low tire pressure warning devices on all road vehicles. The sensor assembly provides substantially enhanced measurement sensitivity, and the power saving unit substantially reduces power consumption, which is particularly important in those installations which use a relatively inaccessible battery as a source of electrical power.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic view of a prior art single tire pressure monitor circuit using a single stretch sensor in a bridge circuit;

FIG. 2 is a perspective view of a single tire pressure monitor circuit having four stretch sensors in a bridge circuit;

FIG. 3 is a perspective view similar to FIG. 2 showing an alternate embodiment of a single tire pressure monitor circuit having two stretch sensors arranged in series connected branches of a bridge circuit;

FIG. 4 shows the comparative sensitivity of the prior art bridge circuit of FIG. 1 and the two embodiments shown in FIGS. 2 and 3;

FIGS. 12A and 12B are timing diagrams illustrating the operation of a multi-stage power saving motion detector unit of FIG. 11 at two different wheel speeds.

DETAILED DESCRIPTION OF THE PREFERRED EMBODIMENTS

Figure 5:
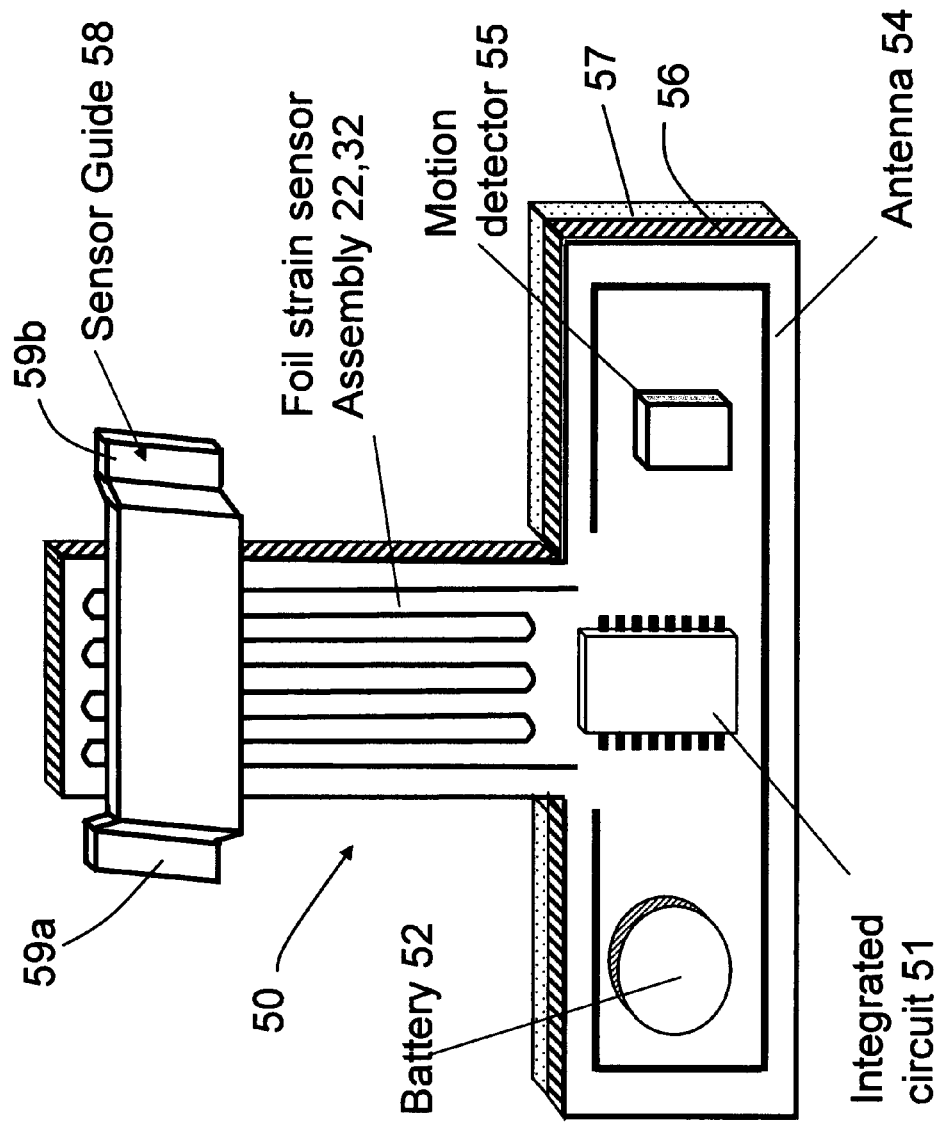
FIG. 5 is a schematic perspective view of a tire pressure monitoring system according to the invention showing the physical layout of the major components.

Turning now to the drawings, FIG. 1 is a schematic view of a prior art single tire pressure monitor circuit using a single stretch sensor in a bridge circuit. As seen in this Fig., the monitor circuit, generally designated with reference numeral 10, includes a single stretch sensor 12 ohmically connected in one branch of a bridge circuit having three additional branches each with a fixed resistance R ohmically connected as shown. Stretch sensor 12 is a known component having the property of an ohmic resistance which varies in a predictable amount with linear longitudinal displacement of the sensor body. Stretch sensor 12 has a first layer 14 on which a thin variable resistance element 15 is mounted; and a second, base layer which carries the first layer and provides additional mechanical strength for sensor 12. The fixed resistances R are all of equal value. A reference voltage Vin from a source of D.C. electrical power (not shown) is applied to two nodes of bridge circuit 10. Stretch sensor 12 is affixed to a vehicle tire (not shown) in such a manner that the stretch sensor 12 will flex as a function of internal pressure. The resistance value of stretch sensor 12 depends upon the amount of flexing due to the internal tire pressure and the direction in which the flexing occurs. As shown in FIG. 1, when sensor 12 flexes in a first direction the value of the resistance increases (R+r), where R is the at rest resistance value of sensor 12 and r is the additional resistance value due to the flexing of sensor 12. Similarly, when sensor 12 flexes in the opposite direction, the value of the resistance decreases (R−r). As the resistance of stretch sensor varies, the measuring voltage Vout will vary accordingly, thus providing a measured value of internal tire pressure.

FIG. 2 is a perspective view of a single tire pressure monitor circuit having four stretch sensors 22a-22d in a bridge circuit 20 according to the invention. As seen in this Fig., each sensor assembly 22 comprises four two layer stretch sensors each having a first layer 24 bearing the variable resistance element, and a base layer 25. Two of the stretch sensors 22a, 22b are arranged with the first layers in facing relation; while the two remaining stretch sensors 22c, 22d are arranged in back-to-back relation. The sensors 22a and 22c which face in the same direction are designated in FIG. 2 with the annotation R+r; while the two sensors 22b and 22d which face in the same direction but opposite from the direction of sensors 22a and 22c are designated with the annotation R−r. The sensors are ohmically connected as shown in FIG. 2 with the R+r sensors arranged in two opposite branches of the bridge circuit 20, and the R−r sensors arranged in the other two opposite branches of the bridge circuit 20. With this arrangement, any variations in resistance due to thermal effects are totally cancelled out electrically, so that measured resistance values are a pure function of internal tire pressure. The sensor assembly 22 is physically mounted to the tire in the manner described below.

FIG. 3 is a perspective view similar to FIG. 2 showing an alternate embodiment of a single tire pressure monitor circuit having two stretch sensors arranged in series connected branches of a bridge circuit. As seen in this Fig., each sensor assembly 32 comprises two two layer stretch sensors each having a first layer 24 bearing the variable resistance element, and a base layer 25. The two stretch sensors 32a, 32b are arranged with the first layers in facing relation in an R+r, R−r configuration. The single layer sensors are ohmically connected as shown in FIG. 3 with the R+r sensor and the R−r sensor arranged in series connection in adjacent branches of the bridge circuit 30. The other two branches of the bridge circuit are provided with fixed resistance elements 26 of equal value R. With this arrangement, any variations in the variable resistance elements due to thermal effects are totally cancelled out electrically, and any variations in the fixed resistance elements R due to thermal effects are totally cancelled out electrically so that measured resistance values are a pure function of internal tire pressure. The sensor assembly 32 is physically mounted to the tire in the manner described below.

FIGS. 4 shows the comparative sensitivity of the prior art bridge circuit of FIG. 1 and the two embodiments of the invention shown in FIGS. 2 and 3. As seen in this Fig., for the single sensor prior art device shown in FIG. 1 the magnitude of the output voltage Vout is a function of r/4R. For the two sensor embodiment of FIG. 3 the magnitude of the output voltage Vout is a function of r/2R. For the four sensor embodiment of FIG. 2, the magnitude of the output voltage Vout is a function of r/R. As will be appreciated by those skilled in the art, the FIG. 2 embodiment provides an increase in sensitivity by a factor of four over the prior art arrangement; while the FIG. 3 embodiment provides an increase in sensitivity by a factor of two. This represents a substantial improvement in measurement capability.

FIG. 5 is a schematic perspective view of a tire pressure monitoring system 50 according to the invention showing the physical layout of the major components. As seen in this Fig., the major components of the tire pressure monitoring system 50 include an integrated circuit 51, a battery 52, a stretch sensor assembly 22 or 32, an antenna 54, and a motion detector 55 (described below). These components are secured in any desired fashion (such as by using a suitable adhesive) to a substrate layer 56. The integrated circuit 51 contains the active electronic components usually found in an r.f. monitoring system and will not be further described as this arrangement is well known to those skilled in the art. The antenna 54 is coupled to the r.f. section of integrated circuit 51 in the usual manner. The stretch sensor assembly 22, 32 is ohmically connected to a bridge circuit contained in integrated circuit 51. Battery 52 is connected to the power input terminals of integrated circuit 51. Substrate layer 56 is adhered to a mounting layer 57 using a suitable adhesive. At least those portions of substrate later 56 and mounting layer 57 underlying stretch sensor assembly 22 or 32 should be sufficiently flexible to allow the stretch sensor assembly to flex with the tire side wall in order to provide an accurate resistance value. For surface mount installations (described below), a generally U-shaped sensor guide 58 having anchor ends 59a, 59b slidably captures sensor assembly 22, 32 and the underlying portions of substrate layer 56 and mounting layer 57. Sensor guide is dimensioned to maintain sensor assembly 22, 32 closely adjacent the tire side wall, while at the same time permitting sliding motion of sensor assembly 22, 32 within sensor guide 58.

Sensor assembly 22, 32 is fixed at the lower end thereof to a first tire anchor point (the outer tire surface, the inner tire surface or an internal anchor point—see below) by adhering the generally rectangular lower portion of substrate layer 56 and mounting layer 57 to the first tire anchor point. The anchor ends 59a, 59b of sensor guide 58 are fixed to a second tire anchor point. When the contour of the tire side wall changes due to a change in internal tire pressure, sensor assembly 22, 32 will flex with the contour change due to the fact that sensor assembly 22, 32 is fixed to the tire anchor point at the lower end thereof and is slidably retained in close proximity to the tire side wall by sensor guide 58. However, since only the lower end of sensor assembly 22, 32 is fixed to the first tire anchor point, sensor assembly 22, 32 cannot be stretched to the breaking point, which could occur if sensor assembly 22, 32 were firmly adhered along its entire length. This mounting arrangement prevents premature failure of sensor assembly 22, 32.

Figure 6:
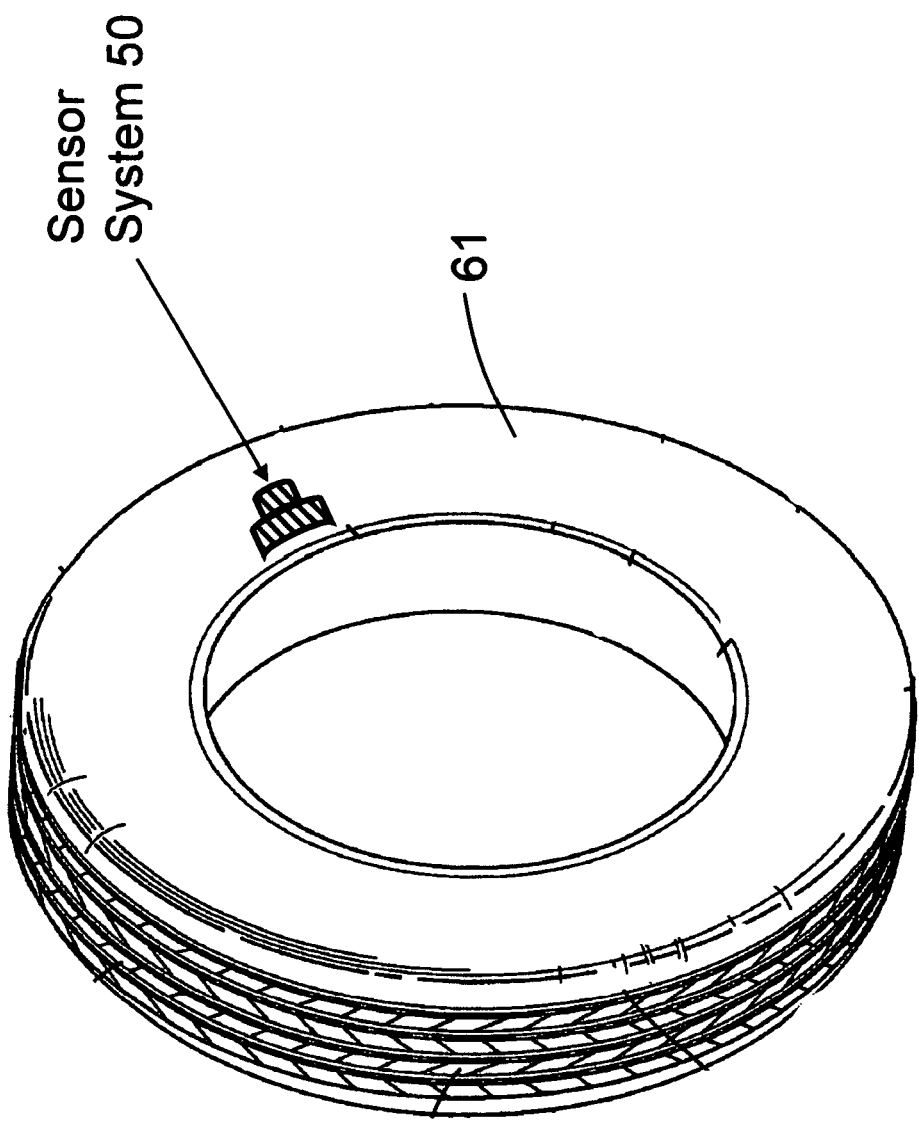
FIG. 6 is a perspective view showing a single tire pressure monitoring system according to the invention mounted on the outside wall of a tire.

As shown in FIG. 6, a single tire pressure monitoring system 50 according to the invention can be mounted on the outside wall of a tire 61 by attaching the mounting layer 57 (FIG. 5) to the tire sidewall at an appropriate location. This can be done using a suitable adhesive, such as an epoxy adhesive. Preferably, the system 50 is adhered to the tire sidewall using a two component hook-and-loop attachment system, such as that sold under the Velcro trademark. This arrangement provides addition vibration damping to an installed tire pressure sensing system.

Figure 7:
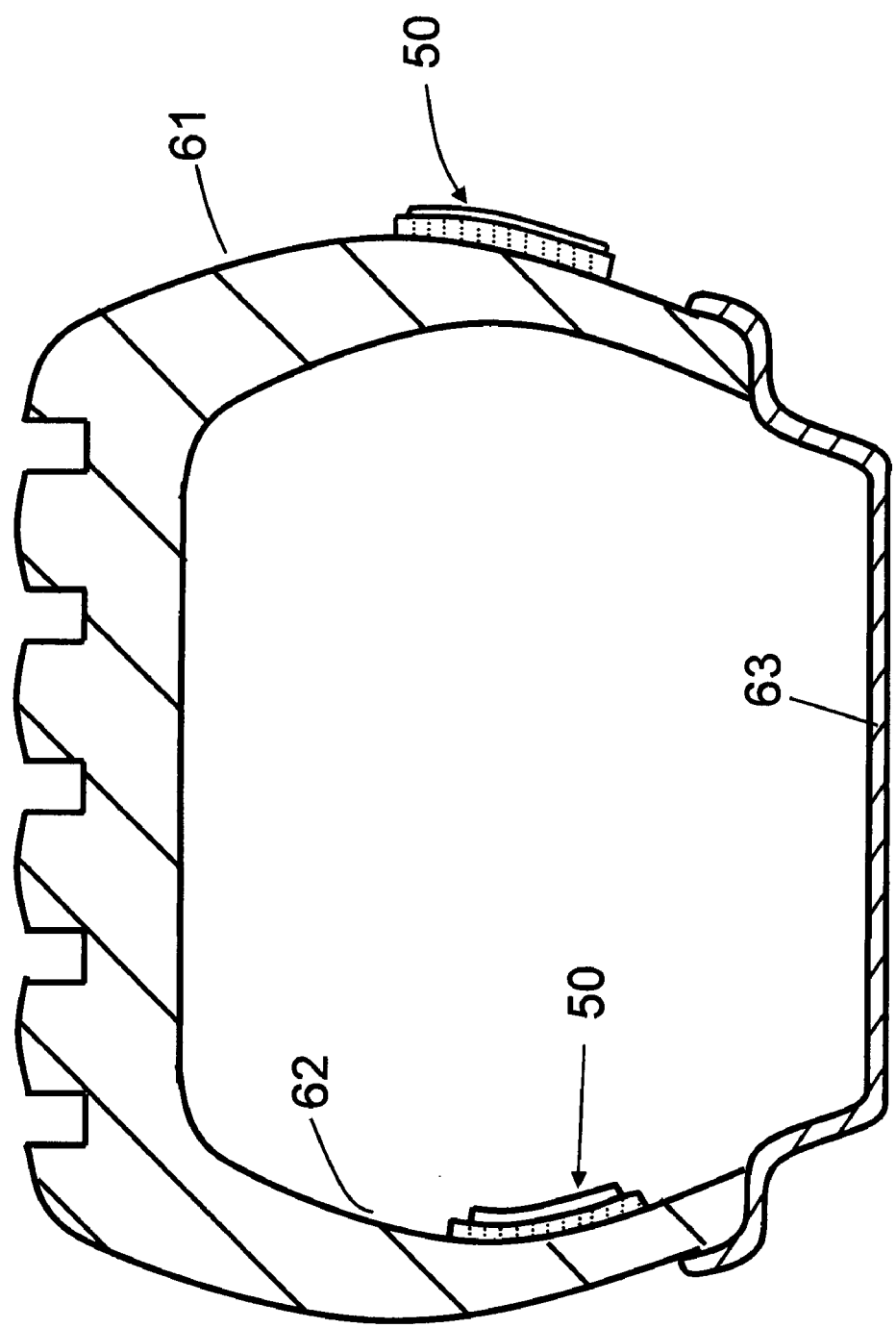
FIG. 7 is a sectional view through a vehicle wheel and tire showing two possible placements of the invention.

FIG. 7 is a sectional view taken through a vehicle tire and wheel assembly illustrating two alternate placements of the tire pressure sensing system 50. As seen in this Fig., the system 50 can be attached to the outside wall 61 of the vehicle tire using the attachment mechanism described above. This placement allows for easy replacement of an exhausted battery 52 since the battery 52 is readily accessible. Alternatively, the system 50 can be attached to the inside tire wall 62 prior to mounting the tire on the wheel 63. This arrangement provides protection for the system 50 components from mechanical abrasion and severe environmental conditions, but has the disadvantage that the tire must be removed from the wheel 63 when battery 52 needs replacement.

Figure 8:
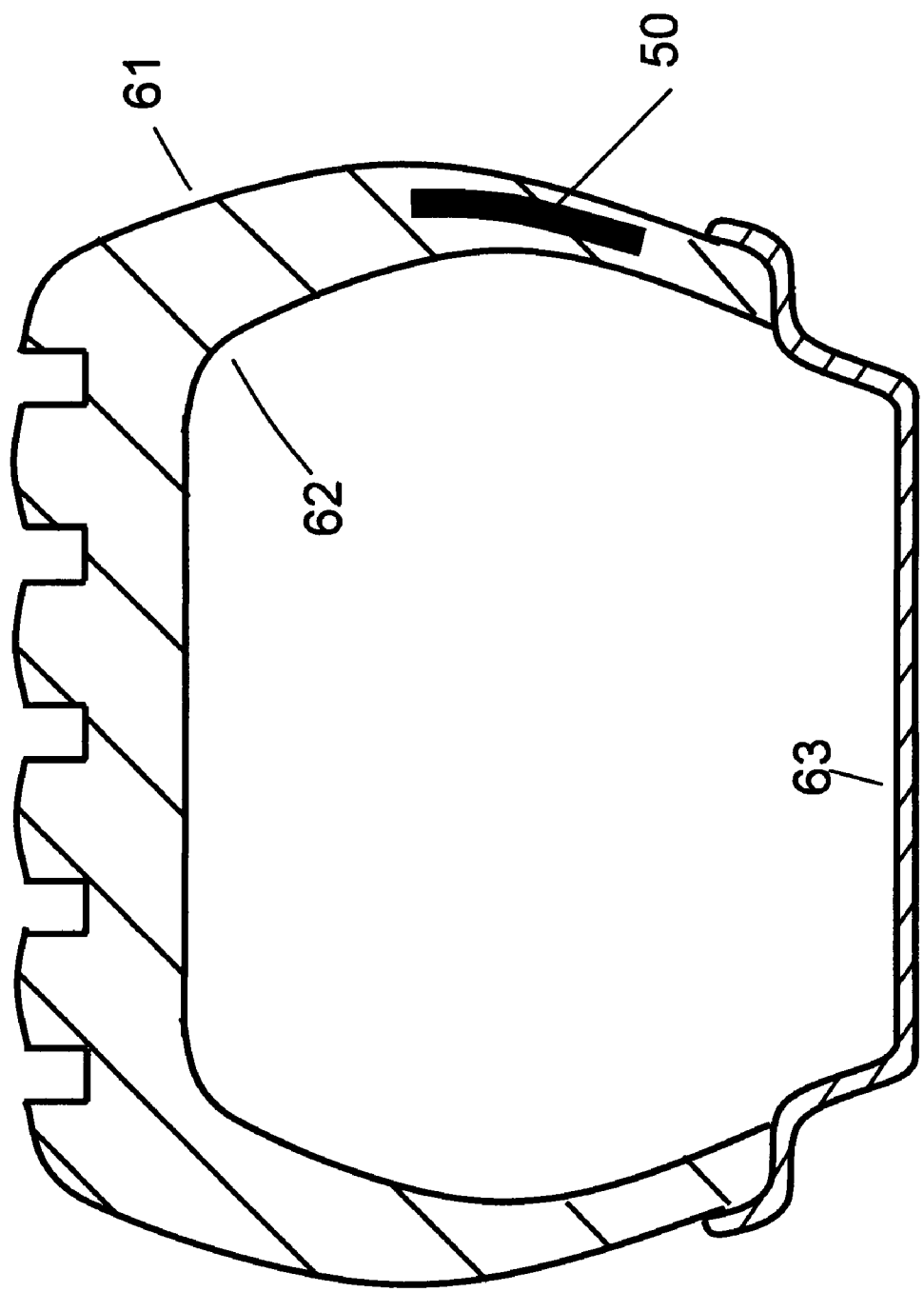
FIG. 8 is a sectional view similar to FIG. 7 showing an internal placement of the invention.

FIG. 8 is a sectional view similar to FIG. 7 showing another alternate placement of the tire pressure sensor system. As seen in this Fig., sensor system 50 is molded into the interior of the tire between outer side wall 61 and inner side wall 62. Since the temperatures required for the tire molding process are relatively low compared to the temperature tolerance of the components of system 50, this internal placement is practical. The internal arrangement shown provides the maximum protection for the components of system 50 since they are entirely encased in the tire material. However, when the battery 52 is exhausted, it cannot be replaced with this arrangement.

The resistance measurement process used to determine internal tire pressure is very similar to that disclosed in the above-referenced pending U.S. patent application Ser. No. 10/346,490. The value of the measured resistance of stretch sensor assembly 22, 32 varies between a maximum R max when the pressure sensor system 50 is located a minimum distance from the pavement and subject to maximum displacement (closest to the pavement), and a minimum R min when the pressure sensor system 50 is at the maximum distance from the pavement (farthest from the pavement) and subject to minimum displacement. The parameter which is used to compute tire pressure is the difference R=(R max)−(R min). This parameter is calculated by programmed circuitry within integrated circuit 51. When this value lies within a predetermined acceptable range defined by two predetermined threshold values, no signal is transmitted from antenna 54 since the internal tire pressure is within the permitted range. When the value of R is greater than a predetermined first threshold value-signifying a low pressure condition, integrated circuit 51 activates an internal r.f. transmitter, which causes a low pressure signal to be transmitted from antenna 54. Similarly, when the value of R is less than a predetermined second threshold value—signifying a high pressure condition, integrated circuit 51 activates the internal r.f. transmitter, which causes a high pressure signal to be transmitted from antenna 54. The low pressure signal or high pressure signal is received by conventional on-board receiver circuitry (not shown), which converts the low or high pressure signal to a perceivable warning signal, such as a visible indicator, an audible alarm, or both. In general, the receiver circuitry includes a decoder for decoding the low and high pressure signals to a form which can be used to operate the warning indicator. Representative examples of such receivers are illustrated and described in U.S. Pat. Nos. 5,900,808; 6,175,301; and 6,453,737. Since the receiver circuitry is conventional and well-known to those skilled in the art, further description is deemed unnecessary.

To conserve battery power, resistance measurements can be made periodically, rather than continuously. For example, an initial vale of R may first be calculated. If the value of R is less than the first threshold value and higher than the second threshold value (i.e. indicates that the tire pressure lies within the acceptable range), integrated circuit 51 will wait for one minute, and then proceed with another calculation of the parameter R. If any calculation results in a value of R which lies outside the range defined by the two threshold levels (i.e. higher than the first threshold or lower than the second threshold), integrated circuit 51 will wait for a shorter period (ten seconds) and then perform another calculation of the parameter R. If the result is another value of R which lies outside the range defined by the two thresholds, integrated circuit 51 activates the r.f. transmitter to generate a low or high tire pressure signal. If the result is a successive value of R which does not lie outside the range defined by the two thresholds, integrated circuit 51 will wait for one minute, and then proceed with the next calculation.

Figure 9:
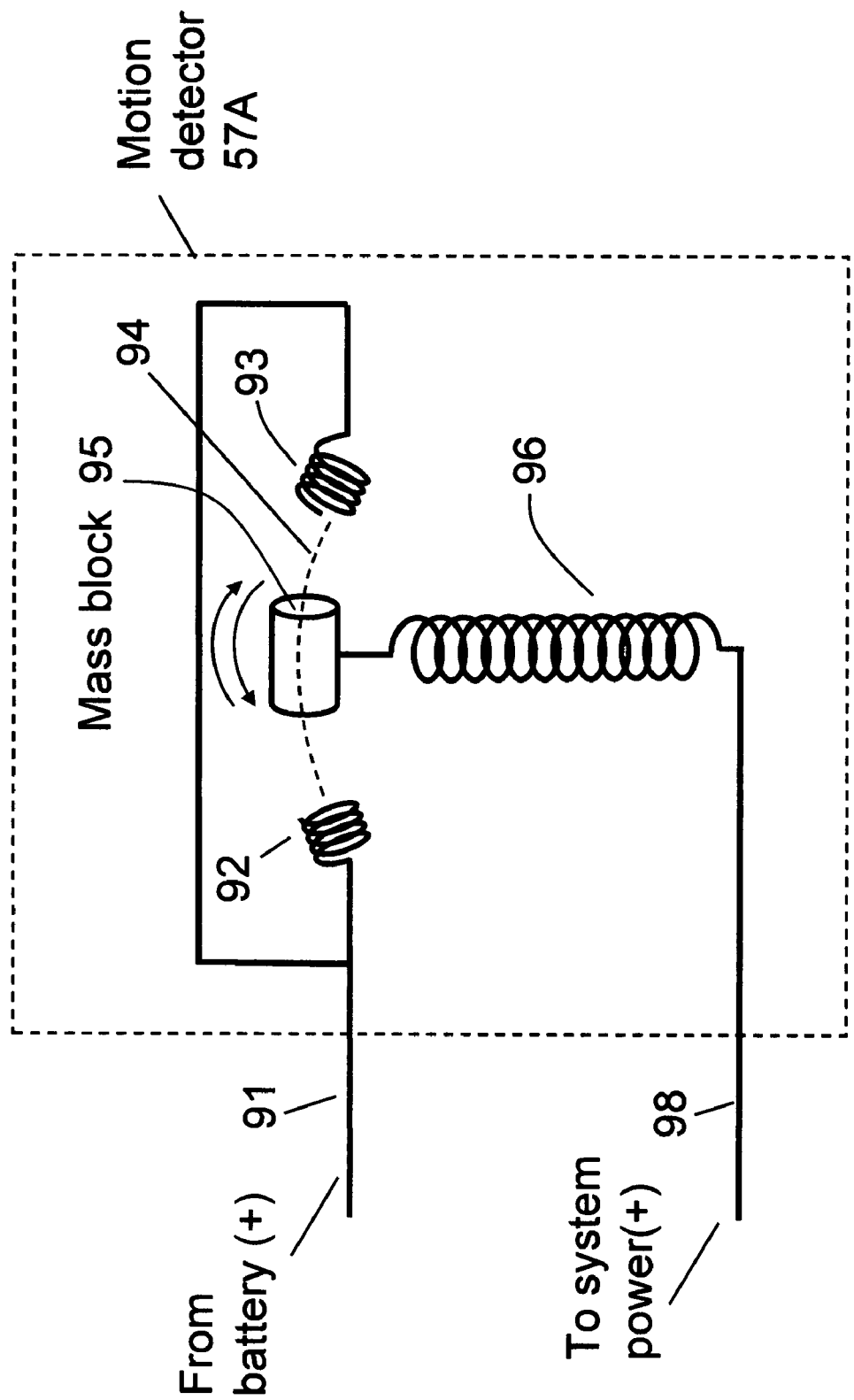
FIG. 9 is a schematic view of a first embodiment of a power saving motion detector unit according to the invention.

To further conserve battery power, power from the battery 52 to integrated circuit 51 is selectively applied under control of a motion detector 55, a first embodiment 55A of which is shown in FIG. 9. As seen in this Fig., one terminal of battery 52 (the positive terminal in this embodiment) is connected to a first terminal 91 of motion detector 55A. Terminal 91 is ohmically connected to a pair of contact springs 92, 93 disposed along a pivot path 94 of a mass block 95. Mass block 95, which is fabricated from an electrically conductive material, is mounted to the upper end of a pivot spring 96, also fabricated from an electrically conductive material. The lower end of pivot spring 96 is ohmically connected to a power output terminal 98. Power output terminal 98 is connected to the power input terminal of integrated circuit 51.

In operation, when the vehicle tire to which tire pressure sensor system 50 is attached is at rest, mass block 95 is positioned centrally of contact springs 92, 93 and maintained in this position by the action of pivot spring 96. In this central position, mass block is out of contact with contact springs 92, 93 and, as a result, power from battery 52 does not flow to output terminal 98 and no power is consumed. As the vehicle tire starts to rotate, mass block 95 is deflected along pivot path 94 under the influence of centrifugal force in the direction of either contact spring 92 or contact spring 93, depending on the orientation of motion detector 55 on the tire side wall and the direction of rotation of the tire. When the rotational speed of the tire reaches a predetermined value (e.g. 10 m.p.h.), mass block 95 is deflected a sufficient distance to make contact with one of the two contact springs 92, 93. At this point, an ohmic electrical circuit is established between power input terminal 91 and power output terminal 98, and D.C. electrical current can flow from battery 52 to integrated circuit 51. It should be noted that the tire speed at which power is applied to integrated circuit 51 is a matter of design choice and can be set at a value deemed appropriate to one of skill in the art. Once a power connection is established between battery 52 and integrated circuit 51, the tire pressure measurement process described above commences.

Figure 10:
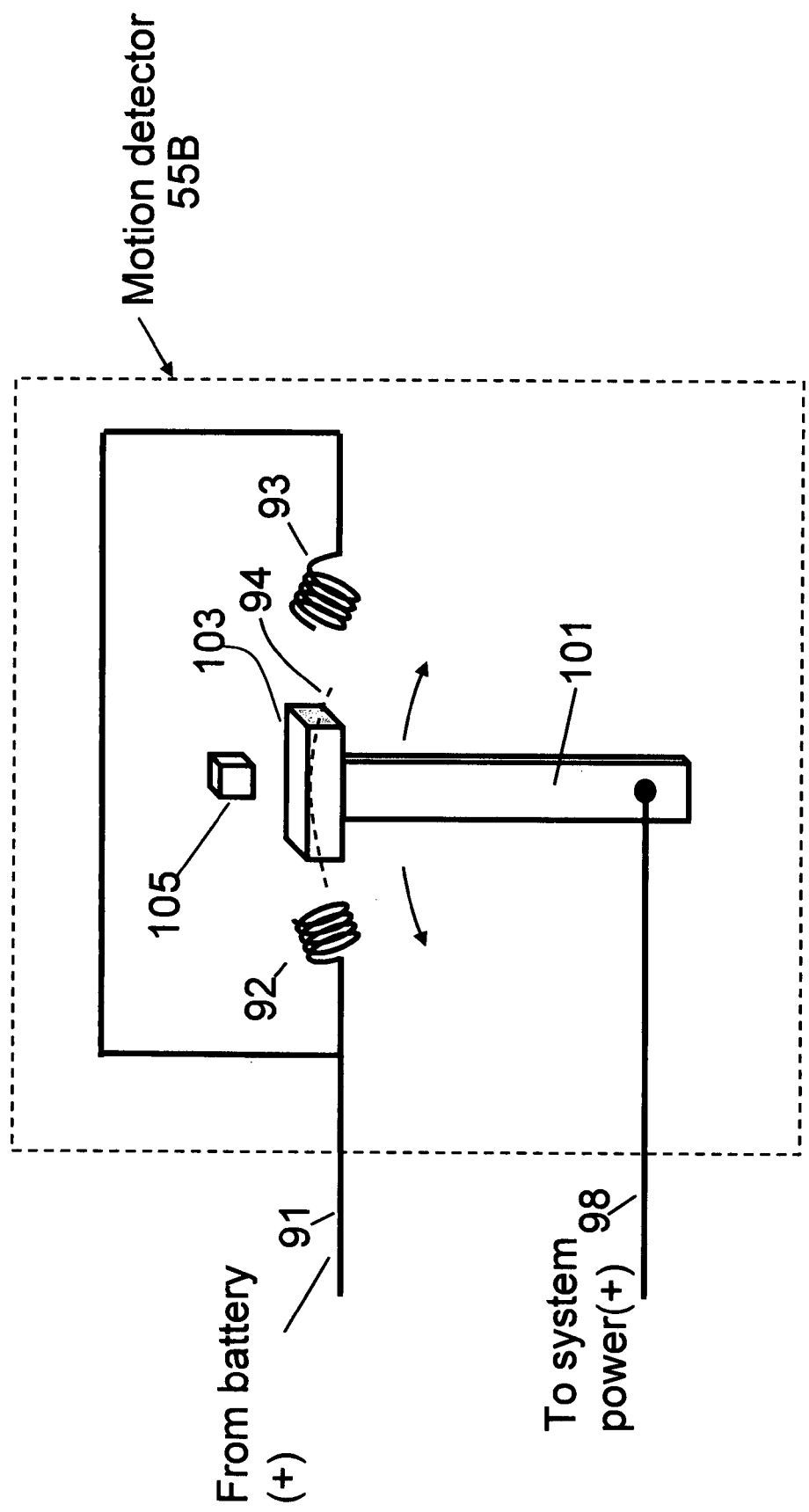
FIG. 10 is a schematic view of an alternate embodiment of a power saving motion detector unit according to the invention.

FIG. 10 illustrates an alternate embodiment of the motion detector 55B. In this embodiment, pivot spring 96 is replaced by a pivot arm 101, pivotally mounted at the bottom end thereof to a fixed reference point and having a ferro-magnetic mass block 103 mounted on the upper end thereof. A permanent magnet 105 is secured to a fixed reference point of motion detector 55B. Operation of the embodiment of FIG. 10 is very similar to the embodiment of FIG. 9, with the difference that the magnetic force between mass block 103 and permanent magnet 105 maintains mass block 103 out of contact with spring 92 or spring 93 until the magnitude of the centrifugal force due to the rotation of the tire exceeds the magnitude of the magnetic holding force between mass block 103 and permanent magnet 105.

Figure 10A:
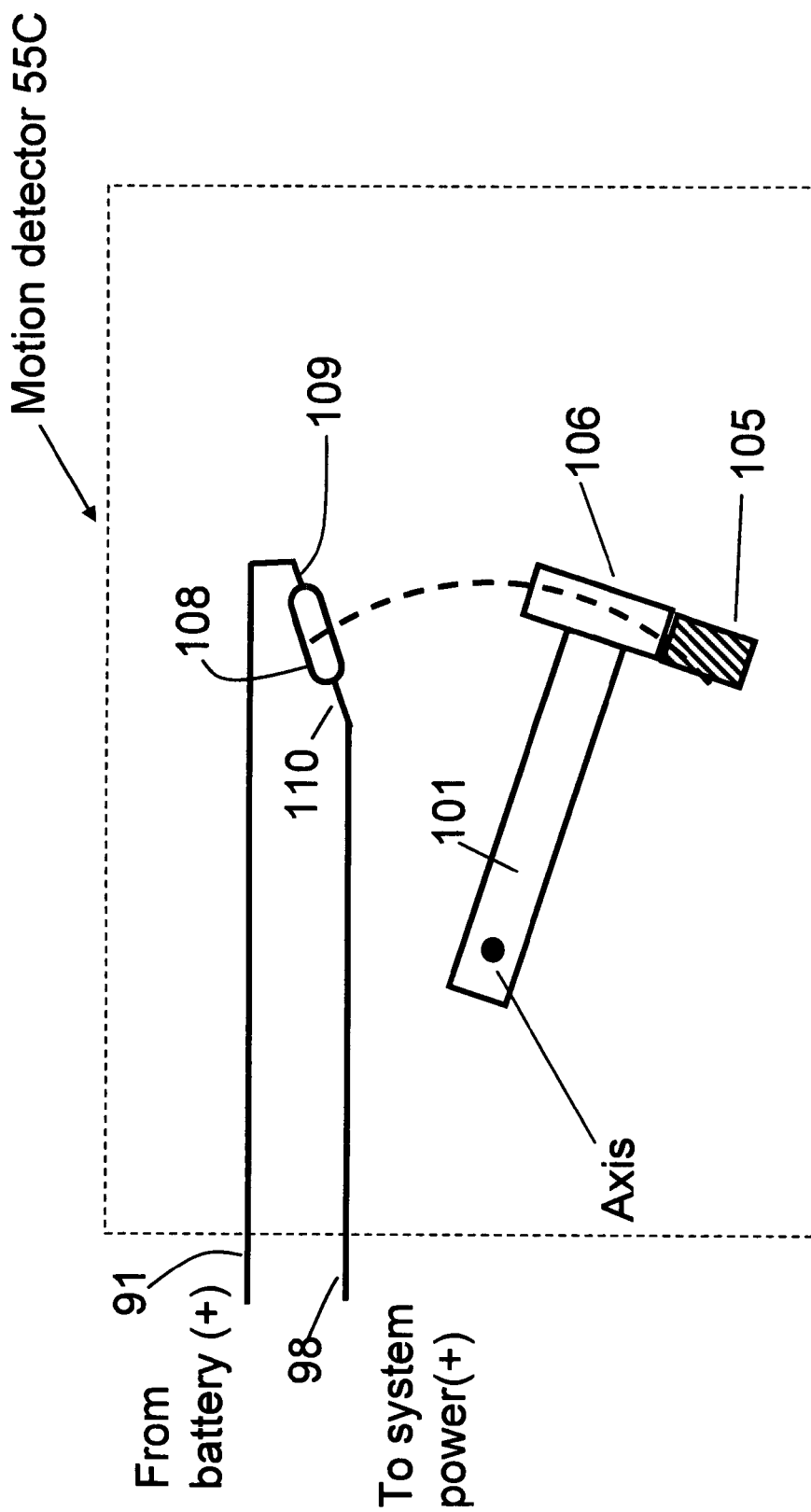
FIGS. 10A and 10B are schematic views of an alternate embodiment of a power saving motion detector unit according to the invention having a reed switch.
Figure 10B:
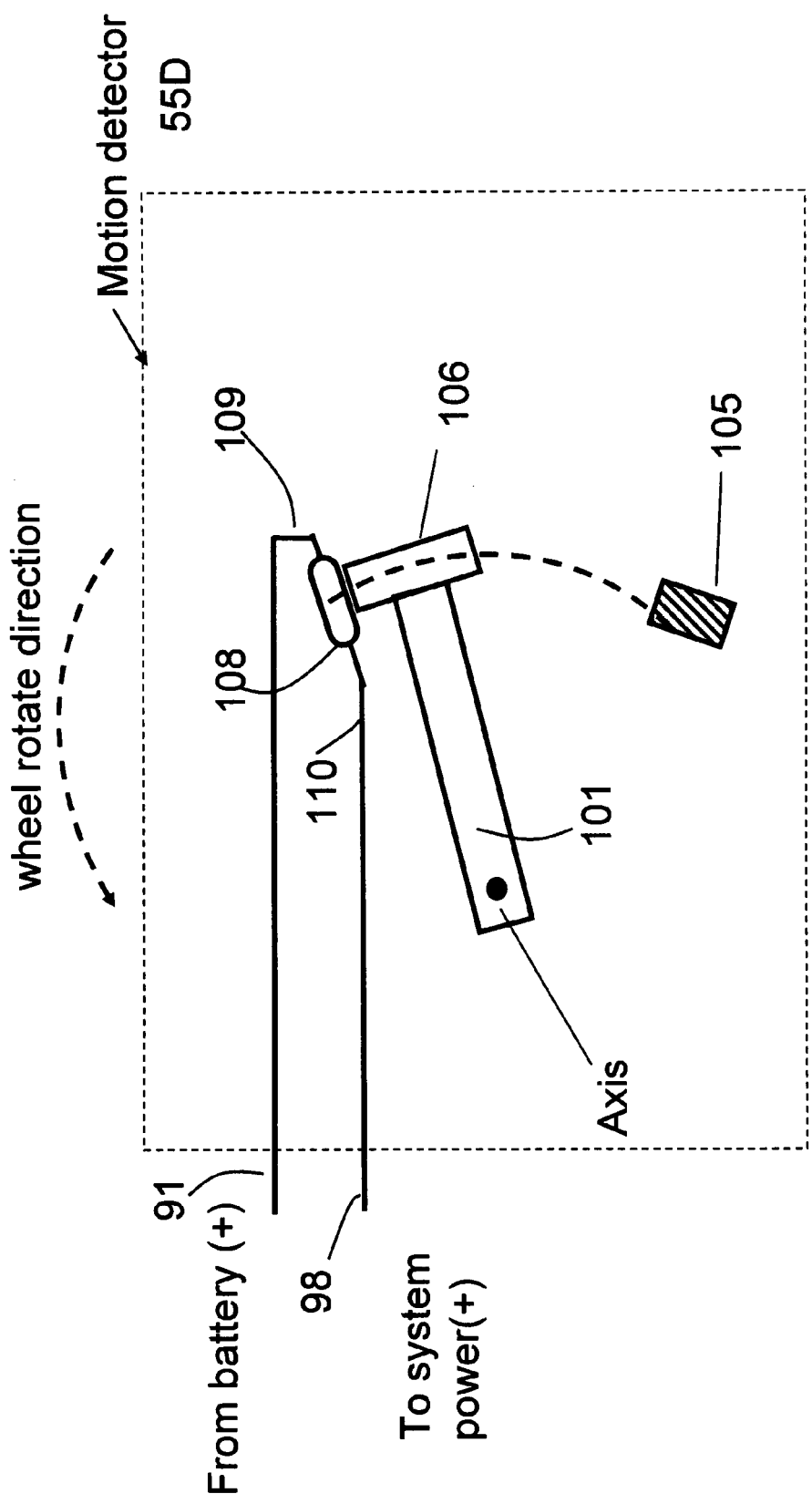

FIGS. 10A and 10B illustrate another alternate embodiment of the motion detector 55C. FIG. 10A shows motion detector 55C in the unactuated state, while FIG. 10B shows motion detector 55C in the actuated state. In this embodiment, pivot arm 101 has a magnet 106 mounted on the upper end thereof. Permanent magnet 105 is secured to a fixed reference point of motion detector 55C. Contact springs 92, 93 are replaced by a magnetically actuated normally open contact reed switch 108 having a first terminal 109 ohmically connected to input terminal 91 and a second terminal 110 ohmically connected to terminal 98. Operation of the embodiment of FIGS. 10A and 10B is as follows. When the magnitude of the centrifugal force due to the rotation of the tire is less than the magnitude of the magnetic holding force between magnet 106 and magnet 105, pivot arm 101 and magnet 106 are maintained in the attitude illustrated in FIG. 10A, in which magnet 106 is sufficiently remote from reed switch 108 that reed switch remains in the unactuated state and no electrical power is transferred between terminal 91 and terminal 98. When the magnitude of the centrifugal force due to the rotation of the tire exceeds the magnitude of the magnetic holding force between magnet 106 and magnet 105, pivot arm 101 and magnet 106 are rotated (counterclock wise in FIG. 10B) so that magnet 106 approaches reed switch 108 and causes the contacts therein to close, thereby ohmically connecting terminals 91 and 98 and transferring electrical power from battery 52 to integrated circuit 51. While only one reed switch 108 is shown in FIGS. 10A and 10B, it is understood that a pair of reed switches 108 may be used in motion detector 55C positioned at locations similar to the locations of contact springs 92, 93 in the embodiment of FIG. 9.

Figure 11:
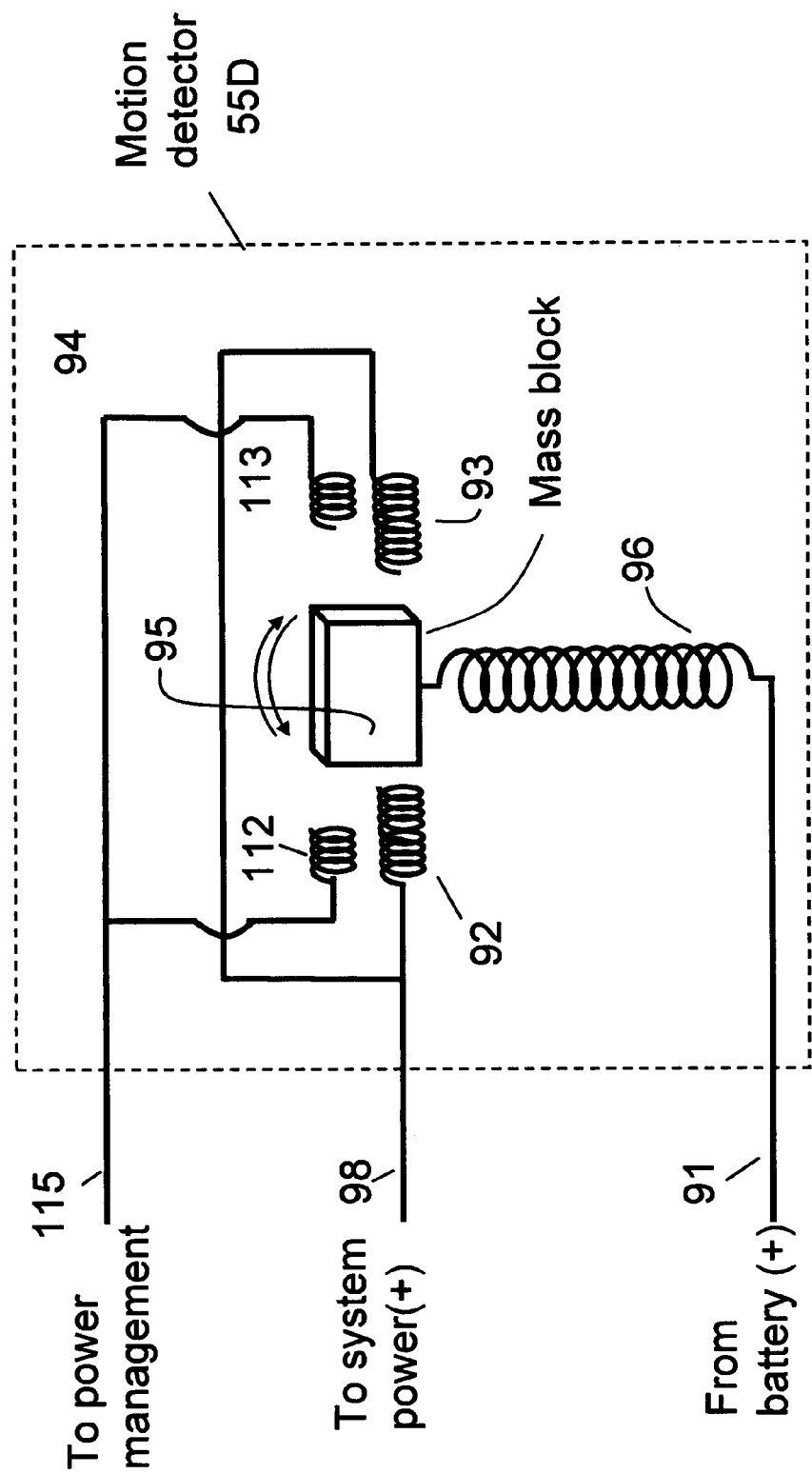
FIG. 11 is a schematic view of a multi-stage embodiment of a power saving motion detector unit according to the invention.

As will now be apparent, the inclusion of motion detector 55A-55C in the power circuit of tire pressure sensor system 50 prolongs the useful life of battery 52 by preventing the application of D.C. electrical power to integrated circuit 51 when the vehicle to which the tire is rotatably attached is at rest or moving at a speed at which tire pressure is not a matter of concern. Even further power savings can be achieved by the multi-stage motion detector 55D shown in FIG. 11. As seen in this Fig., multi-stage motion detector 55D has the same elements 91, 92, 93, 94, 95, 96, and 98 incorporated therein as motion detector 55A. In addition, motion detector 55D includes an additional pair of power contact springs 112, 113 mounted along opposite ends of the pivot path 94 of mass block 95 but arranged at points along the pivot path 94 which are outboard of the inner contact faces of contact springs 92, 93. Power contact springs 112, 113 are ohmically connected in parallel to an additional output terminal 115, which is connected to a dedicated input port of integrated circuit 51. The purpose of contact springs 112, 113 and output terminal 115 is to provide a control signal to integrated circuit 51 signifying that the tire rotation speed has achieved a predetermined higher value than that signified by contact between mass block 95 and either contact spring 92 or contact spring 93. For example, the mechanical parameters controlling the rotational speed at which springs 92, 93 and mass block 95 make contact and permit the application of electrical power to integrated circuit 51 to enable the tire pressure measurement process may be set at 10 m.p.h.; while the mechanical parameters controlling the rotational speed at which springs 112, 113 and mass block 95 make contact and generate the control signal may be set at 50 m.p.h. The control signal on output terminal 115 is used for the following purpose.

During the tire pressure measurement process, a significant amount of power is consumed from battery 52 when electrical current is applied to sensor assembly 50. Multi-stage motion detector 55D enables integrated circuit 51 to minimize the total amount of current applied during the measurement process by limiting the measurement period to the time period required to make an accurate measurement of the tire pressure as a function of vehicle speed. FIGS. 12A and 12B illustrate this power tailoring technique for a 205/65R15 tire having a radius of 0.32 m. For a vehicle speed of 10 m.p.h., the time required for one revolution of this specific tire is 0.45 second. Thus, the minimum time period required to obtain a measurement of Rmin and Rmax is 0.45 second. Since the angular position of the tire at any given moment when electrical power is applied to integrated circuit 51 is indeterminate with the present system, it is prudent to enable the tire pressure measurement process for two complete revolutions of the tire after power is applied. With reference to FIG. 12A, at a vehicle speed of 10 m.p.h. the tire pressure measurement process is enabled for 0.90 second, which is the time required for two complete revolutions of the tire after the measurement process is enabled. Thus, with motion detector 55D, after electrical power is transferred from battery 52 to integrated circuit 51 via the conductive path terminal 91, spring 96, mass block 95, contact spring 92 or 93, and terminal 98, the tire pressure measurement process is enabled for 0.90 second when the control signal on terminal 115 is inactive or deasserted.

For a vehicle speed of 50 m.p.h., the time required for one revolution of the same tire is 0.09 second; and two complete revolutions require 0.18 second. Thus, the minimum time period established to obtain a reliable measurement of Rmin and Rmax is 0.18 second. With reference to FIG. 12B, at a vehicle speed of 50 m.p.h. the tire pressure measurement process is enabled for 0.18 second, which is the time required for two complete revolutions of the tire after the measurement process is enabled. Thus, with multi-stage motion detector 55D, after electrical power is transferred from battery 52 to integrated circuit 51 via the conductive path terminal 91, spring 96, mass block 95, contact spring 92 or 93, and terminal 98; and electrical power is transferred from battery 52 to integrated circuit 51 via the conductive path terminal 91, spring 86, mass block 95, contact spring 112 or 113, and terminal 115 (thereby asserting the control signal), the tire pressure measurement process is enabled for only 0.18 second.

As will now be apparent, multi-stage motion detector 55D limits power consumption during the tire pressure measurement process while still allowing an accurate measurement of tire pressure to be obtained. It is understood that, although multi-stage motion detector 55D has been described with reference to the common elements of motion detector 55A, detector 55D may be configured using the common elements of motion detectors 55B and 55C. Also, it is understood that additional stages may be added to multi-stage motion detector 55D to incorporate more and different speed thresholds than the two thresholds described above. For example, an additional set of contact springs may be installed at wider spacings than contact springs 112, 113 shown in FIG. 11 to specify a third, higher speed threshold with a shorter power-on time period. Further, it is understood that the measurement periods can be based on a different number of revolutions of the tire than the two revolution example in the preferred embodiment, if desired.

While the preferred embodiments have been thus-far described as a single unit for one tire, in practice each tire of a vehicle will be equipped with a tire pressure sensor system 50. Various encoding arrangements can be made to uniquely identify each individual sensor, and the warning indicator can be configured to identify the particular tire which is improperly inflated.

As will now be apparent, the invention provides a simple, low cost tire pressure sensor system which is relatively simple in construction and enjoys higher measurement sensitivity than known systems using a single stretch sensor. In addition, the tire pressure sensor system according to the invention can accommodate various modes of installation, such as being incorporated into the tire during manufacture, installed on the inside wall of the tire before mounting on the wheel, and installed on the outer side wall of the tire after mounting on the wheel. Further, the motion detector portion of the invention limits power consumption and thus prolongs battery life. Lastly, the invention provides an accurate and reliable system for monitoring tire safety on all vehicles using pneumatic tires.

While the invention has been described with reference to particular preferred embodiments, various modifications, alternate embodiments, and equivalents may be employed, as desired. For example, paired springs 92, 93 may be replaced with a single spring positioned along the pivot axis of the mass block support member, if desired. If a single spring is used, care must be taken to orient the sensor system in the proper direction on the tire to ensure that application of electrical power to integrated circuit 51 will occur upon forward motion of the vehicle. Also, while the invention has been described with reference to the use of adhesives for attaching the sensor to the tire side wall, other known techniques may be used, if deemed suitable, for the purpose of attaching the sensor to the tire side wall. Therefore, the above should not be construed as limiting the invention, which is defined by the appended claims.

What is claimed is:

1. For use in a tire pressure sensor system having a variable resistance sensor for providing resistance values indicative of internal tire pressure when coupled to a pneumatic tire; a processor coupled to said sensor for converting resistance values corresponding to inadequate internal tire pressure to r.f. generator activation signals; and an r.f. generator circuit for transmitting an unsafe tire pressure warning signal when activated by said processor; a power saving unit for limiting the application of electrical power to said variable resistance sensor, said power saving unit including an input terminal adapted to be coupled to a source of electrical power, an output terminal for supplying electrical power to said variable resistance sensor, and a vehicle speed sensitive switch for connecting said input terminal to said output terminal when said tire attains a first predetermined speed and for disconnecting said input terminal from said output terminal when the speed of said tire drops below said first predetermined speed.

2. The invention of claim 1 wherein said switch comprises an electrically conductive contact member having a first portion electrically connected to one of said input terminal and said output terminal and a free end, and an electrically conductive pivot member electrically connected to the other one of said input terminal and said output terminal and including a movable mass member for establishing electrical contact with said free end of said contact member when said tire attains said first predetermined speed and for disestablishing electrical contact with said free end of said contact member when the speed of said tire drops below said first predetermined speed.

3. The invention of claim 2 wherein said first portion of said contact member is connected to said input terminal, and said first portion of said pivot member is connected to said output terminal.

4. The invention of claim 2 wherein said first portion of said contact member is connected to said output terminal, and said first portion of said pivot member is connected to said input terminal.

5. The invention of claim 2 wherein said pivot member comprises a spring having a first end on which said mass member is mounted for motion in response to tire motion and a second substantially stationary end.

6. The invention of claim 2 wherein said pivot member comprises a pivot arm having a first portion pivotally mounted to a fixed reference point of said switch and a second portion on which said mass member is secured.

7. The invention of claim 2 wherein said switch further includes a bias force member for providing a resistive force tending to oppose movement of said pivot member toward said free end of said contact member.

8. The invention of claim 7 wherein at least a portion of said pivot member is ferro-magnetic; and wherein said bias force member is a permanent magnet.

9. The invention of claim 2 wherein said mass member has opposing ends; and wherein said switch includes first and second contact members connected to said one of said input terminal and said output terminal, said first contact member having a free end located in the path of one of said opposing ends, said second contact member having a free end located in the path of the other one of said opposing ends.

10. The invention of claim 1 wherein said power saving unit further includes a control signal output terminal coupled to said processor; and wherein said vehicle speed sensitive switch includes control signal means for connecting said input terminal to said control signal output terminal when said tire attains a second predetermined speed different from said first predetermined speed and for disconnecting said input terminal from said control signal output terminal when the speed of said tire drops below said second predetermined speed.

11. The invention of claim 10 wherein said switch comprises an electrically conductive contact member having a first portion connected to said output terminal and a free end, and an electrically conductive pivot member having a first portion connected to said input terminal and a mass member mounted on a free end, said mass member being mounted to make physical contact with said free end of said contact member when said tire attains said first predetermined speed; and wherein said control signal means comprises a contact member having a first portion connected to said control signal output terminal and a free end, said mass member being mounted to make physical contact with said free end of said contact member when said tire attains said second predetermined speed.

12. The invention of claim 11 wherein said mass member has opposing ends; and wherein said control signal means includes first and second contact members connected to said control signal output terminal, said first contact member having a free end located in the path of one of said opposing ends, said second contact member having a free end located in the path of the other one of said opposing ends.

13. The invention of claim 1 wherein said switch comprises a magnetically operable reed switch having a first electrically conductive movable contact member with a portion electrically connected to one of said input terminal and said output terminal, a second electrically conductive contact member with a portion electrically connected to the other one of said input terminal and said output terminal; and a reed switch operating member including a movable mass member for establishing electrical contact between said first and second electrically conductive contact members when said tire attains said first predetermined speed and for dis-establishing electrical contact between said first and second electrically conductive contact members when the speed of said tire drops below said first predetermined speed.

14. The invention of claim 13 wherein at least one of said first and second electrically conductive contact members is magnetically susceptible; and wherein said movable mass member includes a magnetic portion for enabling ohmic contact between said first and second electrically conductive contact members when said tire attains said first predetermined speed.

15. The invention of claim 14 wherein said switch further includes a bias force member for providing a resistive force tending to oppose movement of said movable mass member toward said reed switch.

16. The invention of claim 15 wherein said bias force member comprises a fixed ferro-magnetic element.

17. A method of reducing power consumption in an electrically powered tire pressure sensor system having a variable resistance sensor for providing resistance values indicative of internal tire pressure when coupled to a pneumatic tire, a processor coupled to the sensor for converting resistance values corresponding to inadequate tire pressure to r.f. generator activation signals, and an r.f. generator circuit for transmitting an unsafe tire pressure warning signal when activated by the processor, said method comprising the steps of:
  (a) providing a source of electrical power; and
  (b) applying the electrical power to the variable resistance sensor for a tire pressure measurement period whose duration is related to tire speed.

18. The method of claim 17 wherein said step (b) of applying includes the steps of (i) preventing the application of electrical power to the variable resistance sensor until the tire speed reaches a first tire speed threshold, (ii) furnishing electrical power to the variable resistance sensor for a measurement period related to the period of time required for a preselected number of tire revolutions at the first tire speed threshold when the tire speed reaches the first tire speed threshold, and (iii) terminating the application of electrical power to the variable resistance sensor when the tire speed falls below the first tire speed threshold.

19. The method of claim 18 wherein said step (b) of applying further includes the step of changing the length of the measurement period to a different value when the tire speed reaches a second tire speed threshold, the different value being related to the period of time required for a preselected number of tire revolutions at the second tire speed threshold.

20. The method of claim 18 wherein the preselected number of tire revolutions is two.

* * * * *